United States Patent [19]

Inoue et al.

[11] Patent Number: 4,662,508
[45] Date of Patent: May 5, 1987

[54] PRODUCT FEEDING DEVICE FOR COMBINATION WEIGHING MACHINE

[75] Inventors: Shinichi Inoue, Kobe; Hiroshi Kishida; Yasushi Oshima, both of Akashi, all of Japan

[73] Assignee: Yamato Scale Company, Limited, Japan

[21] Appl. No.: 756,098

[22] Filed: Jul. 17, 1985

[30] Foreign Application Priority Data

Jul. 24, 1984 [JP] Japan .................... 59-154924

[51] Int. Cl.⁴ ............... G01G 11/08; B65G 47/46
[52] U.S. Cl. ...................... 198/601; 198/608; 198/637; 198/803.16; 177/25
[58] Field of Search ............ 198/365, 504, 505, 601, 198/608, 637, 803.16, 445; 177/25, 28

[56] References Cited

U.S. PATENT DOCUMENTS

| | | | |
|---|---|---|---|
| 836,325 | 11/1906 | Kevlin | 198/803.16 X |
| 3,061,074 | 10/1962 | Musschoot | 198/803.16 X |
| 4,078,649 | 3/1978 | Prydtz | 198/365 |
| 4,560,015 | 12/1985 | Minamida | 177/25 |
| 4,561,510 | 12/1985 | Sugioka et al. | 177/25 X |

FOREIGN PATENT DOCUMENTS

| | | | |
|---|---|---|---|
| 0334401 | 3/1921 | Fed. Rep. of Germany | 198/803.16 |
| 0786855 | 9/1935 | France | 198/803.16 |

*Primary Examiner*—Robert J. Spar
*Assistant Examiner*—Lyle Kim
*Attorney, Agent, or Firm*—Senniger, Powers, Leavitt and Roedel

[57] ABSTRACT

A novel product feeding device for a combination weighing machine. The feeding device is designed to feed a plurality of weighing hoppers of the machine with product, such as uncooked meat, having sticky characteristics so that it cannot be conveyed by vibrating conveyor troughs as used in prior art conventional combination weighing machines. The novel feeding device includes a plurality of horizontal rotating discs corresponding to respective weighing hoppers. The discs are arranged in successively overlapping fashion for transferring product fed to the discs at one sides thereof to respective weighing hoppers disposed under the discs at the opposite sides thereof.

10 Claims, 8 Drawing Figures

PRODUCT FEEDING DEVICE FOR COMBINATION WEIGHING MACHINE

BACKGROUND OF THE INVENTION

This invention relates to a novel product feeding device for combination weighing machines. This device is especially useful to feed product, such as uncooked meat containing oil and/or water, having sticky characteristics so that it cannot be conveyed by vibrating conveyor troughs as used in conventional combination weighing machines.

As a device for distributively feeding product to be weighed to a plurality of weighing hoppers of a combination weighing machine, there has been proposed such a type having a plurality of vibrating conveyor troughs disposed radially or side by side for transferring product fed to one end thereof from a central dispersion feeder or a linear feeder to the respective weighing hoppers under the other end thereof. Typical examples of this type of feeding device are disclosed in opened British patent specification Nos. GB2074329A and GB2125756A. The former discloses the radial type and the latter discloses the linear side-by-side type. In these examples, a conveyor trough associated with each weighing hopper is selectively subjected to linear slanting vibration for a predetermined time for feeding an approximate predetermined amount of product to the weighing hopper. Although this type of vibratory feeding device is effective to feed dry product having a relatively low coefficient of friction to the conveyor trough, it is inefficient and sometimes ineffective to feed wet and sticky product, such as uncooked meat.

SUMMARY OF THE INVENTION

Therefore, an object of this invention is to provide a novel product feeding device for a combination weighing machine, which is particularly effective and efficient to selectively feed a predetermined amount of wet and sticky product to each hopper.

In accordance with this invention, a novel and ingenious device is provided by including a plurality of horizontal rotating discs arranged side by side in successively overlapping fashion. Each disc is individually and selectively driven for a predetermined time to transfer product fed thereon from one end of its diameter to the other end to discharge it into a corresponding hopper thereunder. Each disc is provided with a guide for confining the product within its transfer path.

BRIEF DESCRIPTION OF THE DRAWINGS

The detailed structure and operation of the inventive device will be well understood from the following description with reference to the accompanying drawings.

In the drawings.

Throughout the drawings, the same reference numerals are given to corresponding structural components.

DESCRIPTION OF THE PREFERRED EMBODIMENTS

Figure 1:
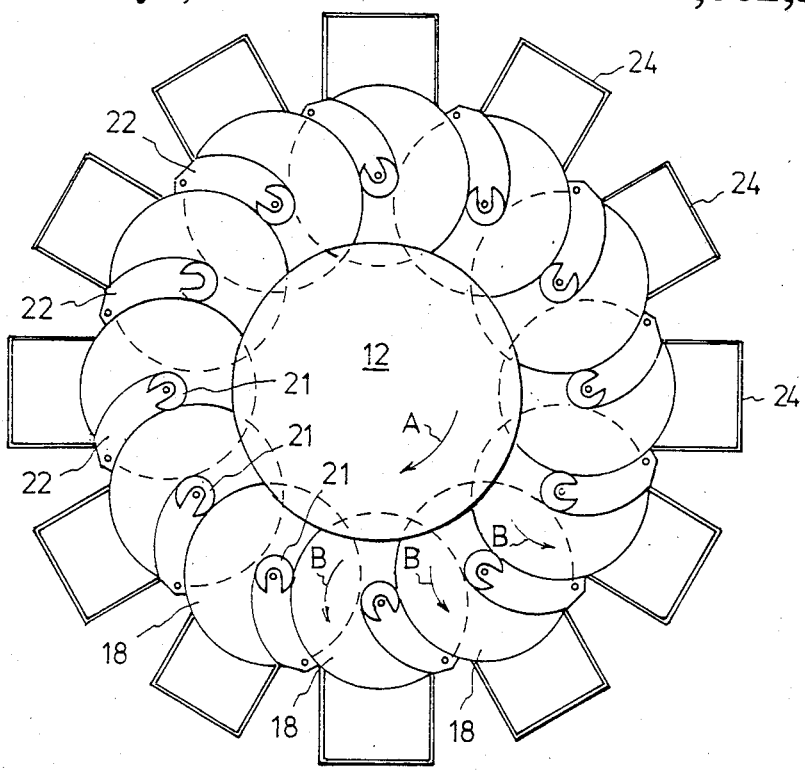
FIG. 1 is a schematic plan view respresenting a radial combination weighing machine including an embodiment of a product feeding device according to this invention.
Figure 2:
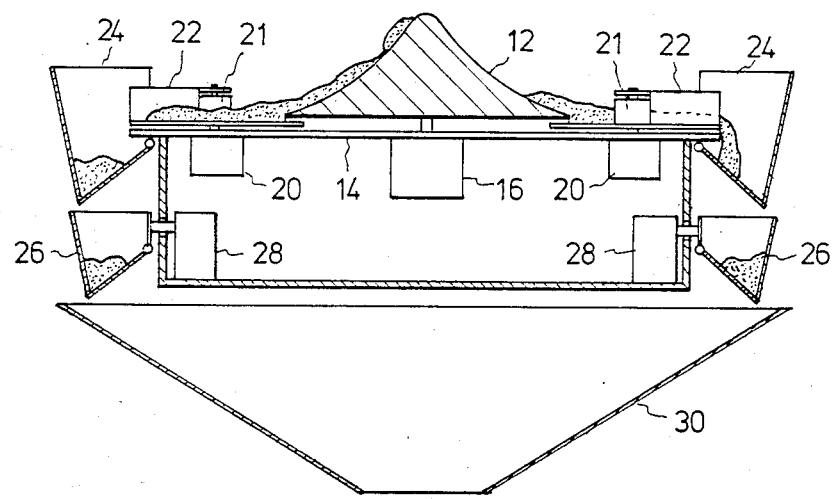
FIG. 2 is a schematic sectional side view of the combination weighing machine of FIG. 1, illustrating a rough arrangement of its structural components.

Referring to FIGS. 1 and 2, this embodiment includes a distributor 12. The distributor 12 is shaped conically as shown and disposed horizontally in the center of the upper surface of a platform 14. The distributor 12 is coupled at its center to a driving shaft of a driving unit 16 disposed under the platform 14 and rotated in clockwise direction as shown by arrow A in FIG. 1.

A plurality of (twelve, in the drawing) rotary discs 18 are arranged circularly around the distributor 12. These discs 18 have their centers arranged at equal intervals on a circle concentric with the distributor 12 and are coupled respectively to driving shafts of driving units 20 disposed under the platform 14. Each disc is rotated selectively and independently in counterclockwise direction as shown by arrow B in FIG. 1 by the corresponding driving unit 20 in response to a command signal from a control section (not shown) of the combination weighing machine. The discs 18 are sequentially overlapped or stepped upwards in counterclockwise direction (that is, in proceeding counterclockwise from one disc to the next as viewed in FIG. 1, a portion of each disc is disposed below a portion of the next disc), and the inner edge margins of the discs extend under the distributor 12. To permit such an overlapping arrangement while maintaining the discs in a generally horizontal plane, the discs 18 are slanted slightly and their driving shafts are also slanted accordingly.

Figure 3:
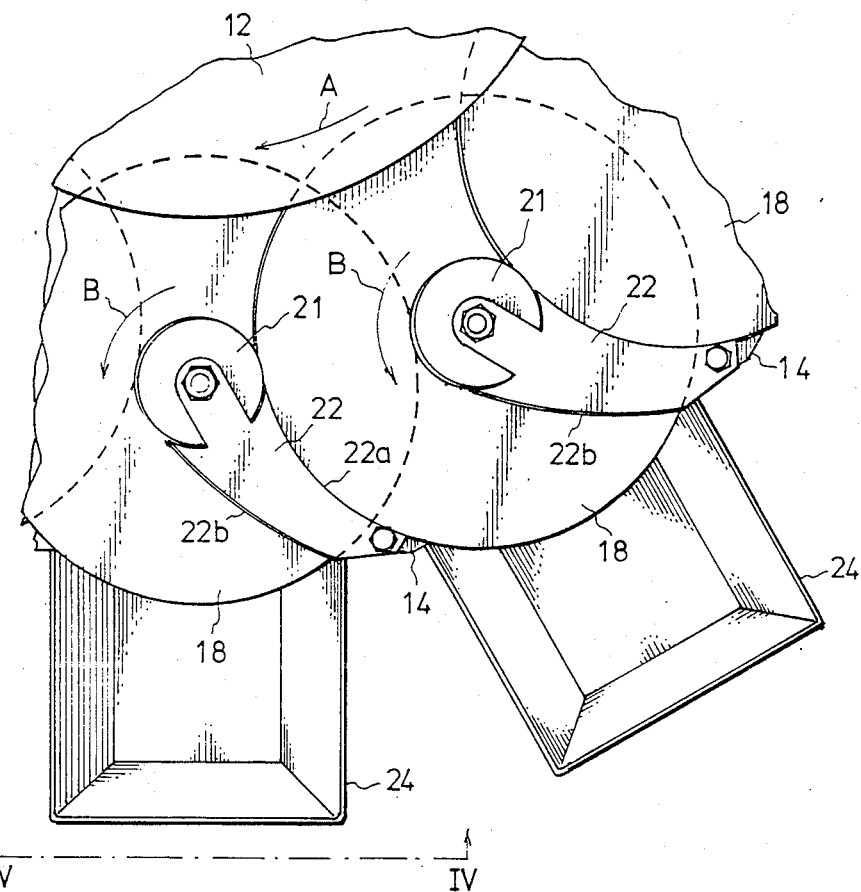
FIG. 3 is an enlarged plan view of a part of the device of FIG. 1.
Figure 4:
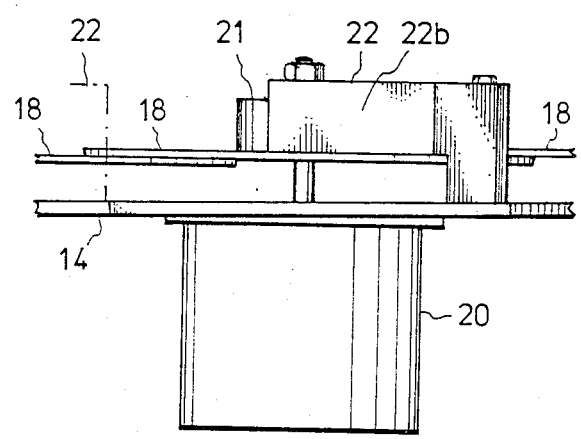
FIG. 4 is a partial side view viewed along line IV—IV of FIG. 3.

As shown in more detail in FIGS. 3 and 4, a cylindrical member 21 is fixedly mounted in the center of the upper surface of each rotary disc 18 to rotate with the disc. An arcuate scraper member 22 extends radially outwardly from the cylindrical member 21 across the upper surface face of each disc 18 along the periphery of the overlapping adjacent disc. The scraper member 22 serves a function of scraping the product to be weighed off the disc 18 and cylindrical member 21 as the disc rotates. The stationary scraper member is fixed at both ends to the driving shaft and the platform 14 leaving a fine gap therebetween. Each rotary disc 18 is associated with a feed hopper 24 disposed between the outer ends of adjoining scraper members 22 and the outer edge of the disc 18 extends radially outwardly into the feed hopper 24. A weighing hopper 26 provided with a weight sensor 28 is located under each feed hopper 24 and a common collecting chute 30 is disposed under all the weighing hoppers 26.

In operation of this product feeding device, the distributor 12 is rotated and the product to be weighed is fed onto its center portion manually or automaticaly by a separate feeding device (not shown). The product is dispersed radially along the conical surface of the distributor 12 by the action of gravity and centrifugal force and delivered onto the surrounding rotary discs 18. The driving unit 20 of each rotary disc 18 is controlled by the control section (not shown) of a combination weighing machine to rotate at a predetermined speed through a predetermined angle of rotation when the corresponding feed hopper has become empty. In this case, the product delivered from the distributor 12 to each disc 18 moves with the rotating disc 18 along the side wall or circumference 22a of the adjoining scraper member 22 toward the outer periphery and is scraped by the opposing side wall 22b of the scraper member 22 on this disc 18 to fall into the feed hopper 24. Generally speaking, therefore, scraper member 22 constitutes guide means for guiding product on the disc into a respective hopper 24 and for preventing product on an adjacent disc from falling off the disc as it rotates. The speed and angle of the rotation of the disc 18 are suitably selected in accordance with the amount of feed to the feed hopper 24. The cylindrical member 21 serves to prevent the product from stagnating in the central portion of the disc 18. The rotation of the distributor 12 may be either constantly continuous, or intermittently synchronous with the rotation of the rotary discs 18.

Figure 5:
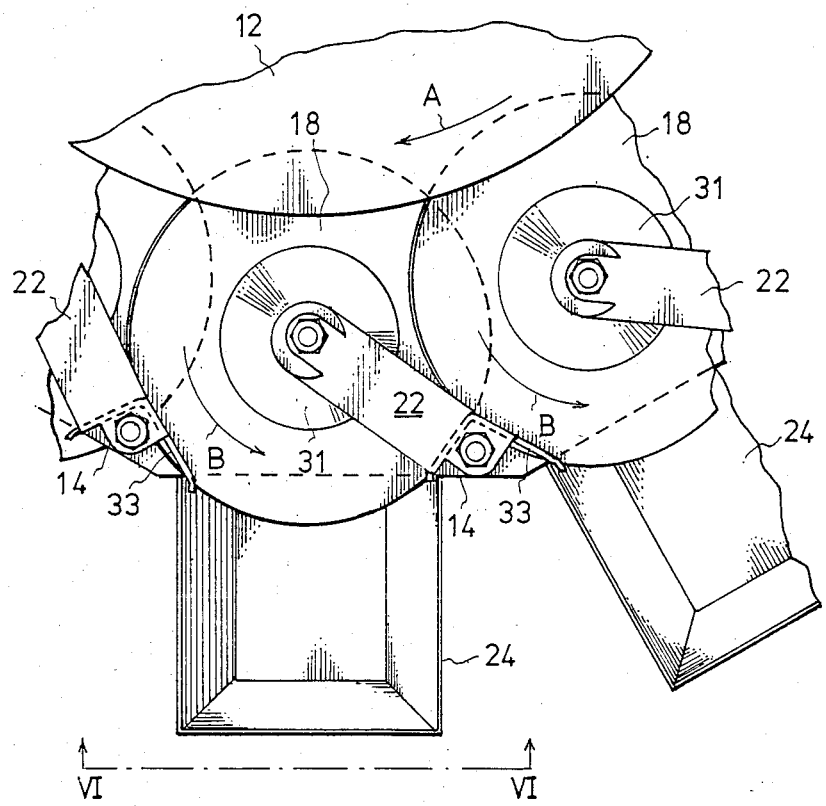
FIG. 5 is an enlarged plan view similar to FIG. 3 representing another embodiment of this invention.
Figure 6:
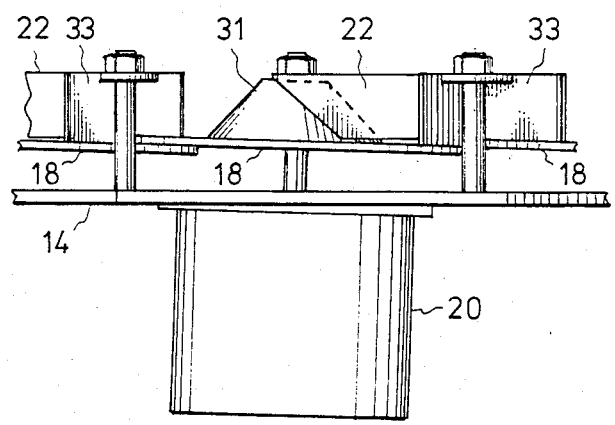
FIG. 6 is a partial side view viewed along line VI—VI or FIG. 5.

The second embodiment shown in FIGS. 5 and 6 is substantially similar in structure to the first embodiment, except that the cylindrical member 21 (FIGS. 1 to 4) is replaced by a frustoconical member 31 and the scraper member 22 is somewhat modified. The modified scraper member 22 has a V-shaped guard plate 33 at its outer end, whose legs extend to two respective adjoining feed hoppers 24 to ensure safe feed of the product into the feed hopper 24. The frustoconical member 31 has a lower base diameter greater than the diameter of the cylindrical member 21 and increases the centrifugal force acting on the product on the disc 18 to prevent its stagnation more effectively. Moreover, this frustoconical shape of the member 31 results in an inverted trapezoidal section of the product piled upon the disc 18, which facilitates adjustment of the amount of feed of the product.

Figure 7:
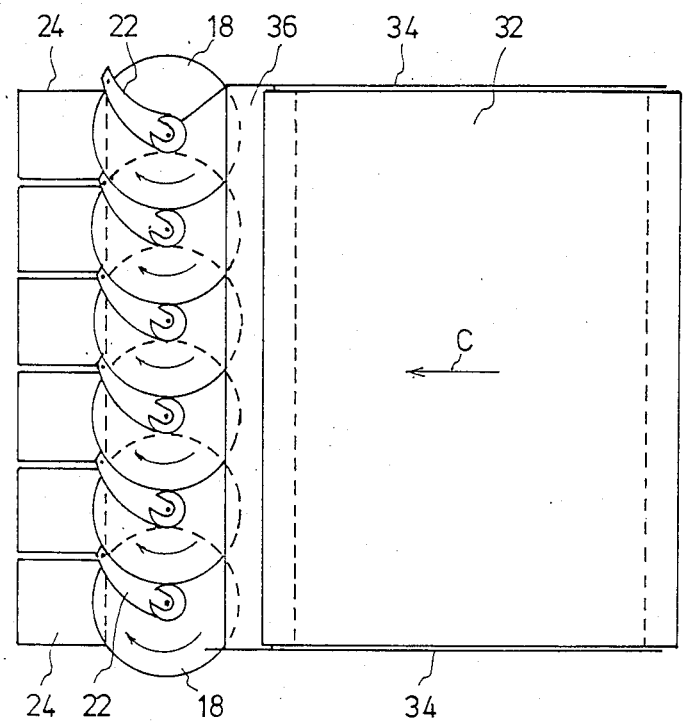
FIG. 7 is a schematic plan view representing a linear combination weighing machine including a further embodiment of a product feeding device according to this invention.
Figure 8:
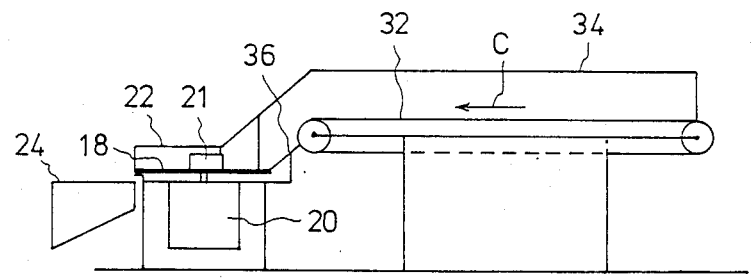
FIG. 8 is a schematic sectional side view of the combination weighing machine of FIG. 7.

In the third embodiment of this invention shown in FIGS. 7 and 8, a plurality of rotary discs 18 are arranged in a row and product to be weighed is fed to these discs 18 by a wide belt conveyor 32 moving in the direction of arrow C. In the drawings, 34 denotes side walls or guard plates and 36 denotes a chute disposed between the belt conveyor 32 and the rotary discs 18. This embodiment is applied to a combination weighing machine of linear side-by-side type. The structure and operation of the discs 18 are quite similar to those in the first and second embodiments.

It should be noted that various modifications and changes can be made on the above-described embodiments without departing the scope and spirit of this invention as defined in the appended claims. For example, while the cylindrical and frustoconical members 21 and 31 in the above embodiments have been illustrated as rotating with the underlying rotary discs 18, they may be incorporated with the scraper member 22 as a unitary body which is stationary regardless of the disc rotation. The rotary disc 18 need not be circular but may be polygonal in shape. Moreover, as is obvious to those skilled in the combination weighing technical field, the feed hoppers 24 may be omitted thereby to feed product from the discs 18 directly into the weighing hoppers 26, and the distributor 12 may be stationary or of the vibratory type. As mentioned in the preface, the belt conveyor 32 of the third embodiment (FIGS. 7 and 8) may be substituted with the linear feeding device disclosed in the opened British patent specification No. GB2125756A.

What is claimed is:

1. A product feeding device for a combination weighing machine having a plurality of hoppers for receiving product to be weighed from said device; said device comprising a plurality of rotary discs arranged side by side in partially overlapping relation, and means for distributively feeding said product onto said rotary discs; each rotary disc corresponding to one of said hoppers and being provided with driving means for selectively and independently rotating said disc, and guide means for guiding said product moving with said disc to said corresponding hopper and for preventing product on an adjacent disc from falling off the disc as it rotates.

2. A product feeding device according to claim 1, wherein said rotary discs are arranged circularly and said distributive feeding means is disposed at the center of said circular arrangement.

3. A product feeding device according to claim 2, said distributive feeding means includes a substantially conical rotating body.

4. A product feeding device according to claim 1, wherein said rotary discs are arranged linearly side by side and said distributive feeding means is disposed in one side of said linear arrangement.

5. A product feeding device according to claim 4, wherein said distributive feeding means includes a belt conveyer.

6. A product feeding device according to claim 1 further comprising anti-stagnation means for preventing stagnation of product on said disc at the center of the disc.

7. A product feeding device according to claim 1 wherein said guide means comprises scraper means for scraping product off said disc into said hopper, said scraper means being disposed generally adjacent the outer circumference of an adjacent disc so that product on the adjacent disc is prevented from falling off the disc as it rotates.

8. A product feeding device according to claim 7 wherein said scraper means comprises a scraper member mounted in fixed position above said disc in a position wherein it extends generally from the center of the disc radially outwardly to the periphery of the disc whereby, on rotation of the disc, the scraper member is adapted to scrape product off the disc into said hopper.

9. A product feeding device according to claim 6 wherein said anti-stagnation means includes a cylindrical or frustoconical central member fixedly mounted on said rotary disc at the center of the disc, said guide means including a radial scraper member extending from said central member across the surface of said disc to the periphery of the disc, one side of the scraper member being disposed generally adjacent the outer circumference of an adjacent disc so that product on the adjacent disc is prevented from falling off the disc as it rotates.

10. A product feeding device according to claim 1 wherein each disc is inclined off horizontal so that the plurality of overlapping discs are maintained in a generally horizontal plane, said driving means for each disc including a driving shaft inclined slightly off vertical.

* * * * *